(12) United States Patent
Kucharski

(10) Patent No.: US 10,882,389 B2
(45) Date of Patent: Jan. 5, 2021

(54) AXLE ASSEMBLY WITH ELECTRIC MOTOR

(71) Applicant: Allison Transmission, Inc., Indianapolis, IN (US)

(72) Inventor: Cyril Kucharski, Saint Victor sur Loire (FR)

(73) Assignee: Allison Transmission, Inc., Indianapolis, IN (US)

( * ) Notice: Subject to any disclaimer, the term of this patent is extended or adjusted under 35 U.S.C. 154(b) by 84 days.

(21) Appl. No.: 16/096,147

(22) PCT Filed: May 8, 2017

(86) PCT No.: PCT/US2017/031570
§ 371 (c)(1),
(2) Date: Oct. 24, 2018

(87) PCT Pub. No.: WO2017/193130
PCT Pub. Date: Nov. 9, 2017

(65) Prior Publication Data
US 2019/0135101 A1    May 9, 2019

Related U.S. Application Data

(60) Provisional application No. 62/333,032, filed on May 6, 2016.

(51) Int. Cl.
*B60K 6/48* (2007.10)
*B60K 1/00* (2006.01)
(Continued)

(52) U.S. Cl.
CPC .................. *B60K 6/48* (2013.01); *B60K 1/00* (2013.01); *B60K 6/52* (2013.01); *B60K 17/04* (2013.01);
(Continued)

(58) Field of Classification Search
None
See application file for complete search history.

(56) References Cited

U.S. PATENT DOCUMENTS 1,093,631 A    4/1914   Kennedy
1,984,830 A   12/1934   Higley
(Continued)

FOREIGN PATENT DOCUMENTS

CA    1213470 A    11/1986
CH     136851 A    11/1929
(Continued)

OTHER PUBLICATIONS

Computer-assisted English language translation for CH136851A extracted from espacenet.com database on Jan. 30, 2019, 4 pages.
(Continued)

*Primary Examiner* — Timothy Hannon
(74) *Attorney, Agent, or Firm* — Barnes & Thornburg LLP

(57) ABSTRACT

An axle assembly (200) includes a first axle housing (102), a second axle housing (104), a first wheel end (216), a second wheel end (218), and at least one drive shaft (150) extending through the first axle housing (102) and the second axle housing (104) and coupled to the first and second wheel ends (216, 218). The axle assembly (200) also includes a gearbox (210) having a body (240) with first and second portions (242, 244) defining a cavity (246) with the first axle housing (102) coupled to the first portion (242) and the second axle housing (104) coupled to the second portion (244). The axle housing (200) further includes an electric motor (122) coupled to the first portion (242) of the body (240). The gearbox (210) includes a gear train (153) having an input shaft (160) having one end coupled to the electric motor (122) and an output shaft (172) rotatably coupled to the input shaft (160). The gear train (153) further includes a
(Continued)

clutch (174) having a shifting fork (178) movable between an engaged state and a disengaged state to couple the output shaft (172) to the drive shaft (150) such that the electric motor (122) drives the drive shaft (150) and to uncouple the output shaft (172) from the drive shaft (150) such that the drive shaft (150) is able to rotate independently from the electric motor (122).

25 Claims, 9 Drawing Sheets

(51) Int. Cl.
*B60K 17/16* (2006.01)
*B60K 17/04* (2006.01)
*B60K 6/52* (2007.10)
*B60K 17/10* (2006.01)

(52) U.S. Cl.
CPC ............ *B60K 17/16* (2013.01); *B60K 17/105* (2013.01); *B60K 17/165* (2013.01); *B60K 2001/001* (2013.01); *B60Y 2200/14* (2013.01); *B60Y 2200/147* (2013.01); *B60Y 2200/148* (2013.01)

(56) References Cited

U.S. PATENT DOCUMENTS

| | | | |
|---|---|---|---|
| 2,047,050 A | 7/1936 | Armington | |
| 3,064,455 A | 11/1962 | Gros | |
| 3,439,767 A | 4/1969 | Lynes et al. | |
| 3,799,284 A | 3/1974 | Hender | |
| 3,923,115 A | 12/1975 | Helling | |
| 4,270,622 A | 6/1981 | Travis | |
| 4,425,989 A | 1/1984 | Gotoda | |
| 4,431,073 A | 2/1984 | Nagao et al. | |
| 4,702,125 A | 10/1987 | Kalns | |
| 4,848,507 A | 7/1989 | Masuda et al. | |
| 5,120,282 A | 6/1992 | Fjallstrom | |
| 5,181,473 A | 1/1993 | Petit et al. | |
| 5,352,164 A | 10/1994 | Bensinger et al. | |
| 5,387,161 A | 2/1995 | Shibahata | |
| 5,419,406 A | 5/1995 | Kawamoto et al. | |
| 5,443,130 A | 8/1995 | Tanaka et al. | |
| 5,558,588 A | 9/1996 | Schmidt | |
| 5,643,119 A | 7/1997 | Yamaguchi et al. | |
| 5,806,617 A | 9/1998 | Yamaguchi | |
| 5,829,542 A | 11/1998 | Lutz | |
| 5,878,830 A | 3/1999 | Ruppert et al. | |
| 5,907,191 A | 5/1999 | Sasaki et al. | |
| 5,927,417 A | 7/1999 | Brunner et al. | |
| 5,934,395 A | 8/1999 | Koide et al. | |
| 6,008,606 A | 12/1999 | Arai et al. | |
| 6,024,182 A | 2/2000 | Hamada et al. | |
| 6,041,877 A | 3/2000 | Yamada et al. | |
| 6,155,954 A | 12/2000 | Itoyama et al. | |
| 6,276,474 B1 | 8/2001 | Ruppert et al. | |
| 6,371,878 B1 | 4/2002 | Bowen | |
| 6,382,339 B1 | 5/2002 | Nemoto | |
| 6,387,007 B1 | 5/2002 | Fini, Jr. | |
| 6,401,850 B1 | 6/2002 | Bowen | |
| 6,416,437 B2 | 7/2002 | Jung | |
| 6,427,797 B1 | 8/2002 | Chang | |
| 6,431,297 B1 | 8/2002 | Nakazawa | |
| 6,431,298 B1 | 8/2002 | Ruppert, Jr. et al. | |
| 6,481,519 B1 | 11/2002 | Bowen | |
| 6,499,549 B2 | 12/2002 | Mizon et al. | |
| 6,557,656 B2 | 5/2003 | Haniu et al. | |
| 6,595,308 B2 | 7/2003 | Bowen | |
| 6,666,313 B2 | 12/2003 | Gochenour et al. | |
| 6,820,707 B1 | 11/2004 | Cantemir | |
| 6,843,750 B1 | 1/2005 | Bennett | |
| 6,935,451 B2 | 8/2005 | Bell et al. | |
| 6,978,853 B2 | 12/2005 | Bennett | |
| 7,028,583 B2 | 4/2006 | Bennett | |
| 7,081,060 B2 | 7/2006 | Hata et al. | |
| 7,128,680 B2 | 10/2006 | Holmes | |
| 7,169,077 B2 | 1/2007 | Laurent et al. | |
| 7,255,187 B2 | 8/2007 | Bell et al. | |
| 7,296,644 B2 | 11/2007 | Teraoka | |
| 7,297,083 B2 | 11/2007 | Duncan | |
| 7,309,300 B2 | 12/2007 | Gamett et al. | |
| 7,410,440 B2 | 8/2008 | Garcia et al. | |
| 7,458,433 B2 | 12/2008 | Harrup et al. | |
| 7,520,354 B2 | 4/2009 | Morrow et al. | |
| 7,819,411 B2 | 10/2010 | Eshelman et al. | |
| 7,854,674 B2 | 12/2010 | Freudenreich | |
| 7,959,170 B2 | 6/2011 | Mauz | |
| 8,348,800 B2 | 1/2013 | Tanaka et al. | |
| 8,536,743 B2 | 9/2013 | Kasuya et al. | |
| 8,663,051 B2 | 3/2014 | Sten | |
| 8,678,968 B2 | 3/2014 | Troennberg et al. | |
| 8,708,857 B2 | 4/2014 | Winter et al. | |
| 8,718,897 B2 | 5/2014 | Wright et al. | |
| 8,739,655 B2 | 6/2014 | Bologna | |
| 8,839,898 B2 | 9/2014 | Mimura et al. | |
| 8,858,379 B2 | 10/2014 | Keeney et al. | |
| 9,039,559 B2 | 5/2015 | Gassmann | |
| 9,102,226 B2 | 8/2015 | Makino | |
| 9,221,496 B2 | 12/2015 | Barr et al. | |
| 9,296,389 B2 | 3/2016 | Bernhardt | |
| 9,400,034 B1 | 7/2016 | Pritchard et al. | |
| 9,429,222 B2 | 8/2016 | Bassi et al. | |
| 9,435,415 B2 | 9/2016 | Gassmann | |
| 9,441,717 B2 | 9/2016 | Smetana | |
| 9,453,564 B1 | 9/2016 | Pritchard et al. | |
| 9,469,214 B2 | 10/2016 | Wright et al. | |
| 9,500,267 B2 | 11/2016 | Hederstad et al. | |
| 9,517,658 B2 | 12/2016 | Chung et al. | |
| 9,534,665 B1 | 1/2017 | Pritchard et al. | |
| 9,541,121 B2 | 1/2017 | Knoblauch | |
| 9,541,172 B1 | 1/2017 | Wright | |
| 9,566,857 B1 | 2/2017 | Pritchard et al. | |
| 9,573,452 B2 | 2/2017 | Agnew | |
| 9,638,302 B2 | 5/2017 | Smetana et al. | |
| 9,719,584 B1 | 8/2017 | Duan et al. | |
| 9,771,037 B2 | 9/2017 | Kugelstadt et al. | |
| 9,908,407 B1 | 3/2018 | Bennett et al. | |
| 2002/0084118 A1 | 7/2002 | Esaki | |
| 2002/0104704 A1 | 8/2002 | Chang | |
| 2002/0142876 A1 | 10/2002 | Holmes et al. | |
| 2003/0111280 A1 | 6/2003 | Platner et al. | |
| 2004/0007406 A1 | 1/2004 | Laurent et al. | |
| 2005/0006164 A1 | 1/2005 | Teraoka | |
| 2006/0094552 A1 | 5/2006 | Duncan | |
| 2006/0225930 A1 | 10/2006 | Schulte | |
| 2010/0276901 A1 | 11/2010 | Richardson et al. | |
| 2011/0094807 A1 | 4/2011 | Pruitt et al. | |
| 2011/0108352 A1* | 5/2011 | Haggerty | B60K 17/165 |
| | | | 180/348 |
| 2013/0019707 A1* | 1/2013 | Ebihara | B60K 7/0007 |
| | | | 74/468 |
| 2013/0240282 A1 | 9/2013 | Bindl | |
| 2014/0288739 A1 | 9/2014 | Braun et al. | |
| 2016/0159249 A1 | 6/2016 | Wright et al. | |
| 2017/0114870 A1 | 4/2017 | Wright | |
| 2017/0219078 A1 | 8/2017 | Wang et al. | |
| 2017/0261082 A1 | 9/2017 | Pritchard et al. | |
| 2017/0363180 A1 | 12/2017 | Steinberger et al. | |
| 2018/0022230 A1 | 1/2018 | Wright et al. | |
| 2018/0080536 A1 | 3/2018 | Nilsson | |
| 2018/0112755 A1 | 4/2018 | Littlefield et al. | |

FOREIGN PATENT DOCUMENTS

| | | |
|---|---|---|
| CN | 2541230 Y | 3/2003 |
| CN | 201151343 Y | 11/2008 |
| CN | 102139629 B | 3/2015 |
| CN | 205326780 U | 6/2016 |
| CN | 205326801 U | 6/2016 |
| CN | 105799480 A | 7/2016 |
| CN | 105799491 A | 7/2016 |
| CN | 103010016 B | 8/2016 |

(56) References Cited

FOREIGN PATENT DOCUMENTS

| | | | |
|---|---|---|---|
| CN | 205468492 | U | 8/2016 |
| CN | 103538474 | B | 9/2017 |
| CN | 107215393 | A | 9/2017 |
| CN | 107284224 | A | 10/2017 |
| CN | 105818861 | B | 11/2017 |
| CN | 206749495 | U | 12/2017 |
| CN | 206781512 | U | 12/2017 |
| CN | 206812717 | U | 12/2017 |
| CN | 105932823 | B | 1/2018 |
| CN | 206884737 | U | 1/2018 |
| CN | 206943366 | U | 1/2018 |
| CN | 104728403 | B | 2/2018 |
| CN | 107738568 | A | 2/2018 |
| CN | 207000142 | U | 2/2018 |
| CN | 207015144 | U | 2/2018 |
| CN | 207015146 | U | 2/2018 |
| CN | 207021829 | U | 2/2018 |
| CN | 105416401 | B | 3/2018 |
| CN | 107776399 | A | 3/2018 |
| CN | 107781378 | A | 3/2018 |
| CN | 107825950 | A | 3/2018 |
| CN | 207225059 | U | 4/2018 |
| DE | 2404427 | C2 | 12/1983 |
| DE | 3617688 | A1 | 12/1986 |
| DE | 19739906 | A1 | 3/1999 |
| DE | 102011088647 | A1 | 6/2013 |
| DE | 102011088648 | A1 | 6/2013 |
| DE | 102012204717 | A1 | 9/2013 |
| DE | 102013214317 | A1 | 1/2015 |
| DE | 102016203970 | A1 | 9/2017 |
| DE | 112016000937 | T5 | 12/2017 |
| DE | 102016014508 | B3 | 3/2018 |
| DE | 102016220630 | A1 | 4/2018 |
| EP | 0079455 | A1 | 5/1983 |
| FR | 2976526 | B1 | 10/2013 |
| FR | 3003813 | A1 | 10/2014 |
| GB | 2176852 | B | 7/1989 |
| GB | 2548975 | A | 10/2017 |
| JP | S5757943 | A | 4/1982 |
| JP | H11240347 | A | 9/1999 |
| JP | 2001025289 | A | 1/2001 |
| JP | 3674402 | B2 | 7/2005 |
| JP | 2018054099 | A | 4/2018 |
| KR | 101839168 | B1 | 3/2018 |
| KR | 20180030234 | A | 3/2018 |
| WO | 8804241 | A1 | 6/1988 |
| WO | 9221529 | A1 | 12/1992 |
| WO | 9921263 | A2 | 4/1999 |
| WO | 2004094868 | A1 | 11/2004 |
| WO | 2006083243 | A1 | 8/2006 |
| WO | 2013170848 | A1 | 11/2013 |
| WO | 2014013084 | A1 | 1/2014 |
| WO | 2017114420 | A1 | 7/2017 |
| WO | 2017144905 | A1 | 8/2017 |
| WO | 2017172614 | A1 | 10/2017 |
| WO | 2017172722 | A1 | 10/2017 |
| WO | 2017207061 | A1 | 12/2017 |
| WO | 2017215823 | A1 | 12/2017 |
| WO | 2017216020 | A1 | 12/2017 |
| WO | 2018001962 | A1 | 1/2018 |
| WO | 2018045027 | A1 | 3/2018 |
| WO | 2018059783 | A1 | 4/2018 |
| WO | 2018130101 | A1 | 7/2018 |

OTHER PUBLICATIONS

English language abstract for CN2541230Y extracted from espacenet.com database on Jan. 30, 2019, 1 page.
English language abstract for CN201151343Y extracted from espacenet.com database on Jan. 30, 2019, 1 page.
English language abstract for CN102139629B extracted from espacenet.com database on Jan. 30, 2019, 1 page.
English language abstract for CN205326780U extracted from espacenet.com database on Jan. 30, 2019, 1 page.
English language abstract for CN205326801U extracted from espacenet.com database on Jan. 30, 2019, 1 page.
English language abstract for CN105799480A extracted from espacenet.com database on Jan. 30, 2019, 1 page.
English language abstract for CN105799491A extracted from espacenet.com database on Jan. 30, 2019, 1 page.
English language abstract for CN103010016B extracted from espacenet.com database on Jan. 30, 2019, 2 pages.
English language abstract for CN205468492U extracted from espacenet.com database on Jan. 30, 2019, 1 page.
English language abstract for CN103538474B extracted from espacenet.com database on Jan. 30, 2019, 1 page.
English language abstract for CN107215393A extracted from espacenet.com database on Jan. 30, 2019, 1 page.
English language abstract for CN107284224A extracted from espacenet.com database on Jan. 30, 2019, 1 page.
English language abstract for CN105818861B extracted from espacenet.com database on Jan. 30, 2019, 1 page.
English language abstract for CN206749495U extracted from espacenet.com database on Jan. 30, 2019, 1 page.
English language abstract for CN206781512U extracted from espacenet.com database on Jan. 30, 2019, 1 page.
English language abstract for CN206812717U extracted from espacenet.com database on Jan. 30, 2019, 1 page.
English language abstract for CN206884737U extracted from espacenet.com database on Jan. 30, 2019, 1 page.
English language abstract for CN105932823B extracted from espacenet.com database on Jan. 30, 2019, 1 page.
English language abstract for CN206943366U extracted from espacenet.com database on Jan. 30, 2019, 1 page.
English language abstract for CN104728403B extracted from espacenet.com database on Jan. 30, 2019, 2 pages.
English language abstract for CN207000142U extracted from espacenet.com database on Jan. 30, 2019, 1 page.
English language abstract for CN207015144U extracted from espacenet.com database on Jan. 30, 2019, 1 page.
English language abstract for CN207015146U extracted from espacenet.com database on Jan. 30, 2019, 1 page.
English language abstract for CN207021829U extracted from espacenet.com database on Jan. 30, 2019, 1 page.
English language abstract for CN107738568A extracted from espacenet.com database on Jan. 30, 2019, 1 page.
English language abstract for CN107776399A extracted from espacenet.com database on Jan. 30, 2019, 1 page.
English language abstract for CN107781378A extracted from espacenet.com database on Jan. 30, 2019, 1 page.
English language abstract for CN105416401B extracted from espacenet.com database on Jan. 30, 2019, 1 page.
English language abstract for CN107825950A extracted from espacenet.com database on Jan. 30, 2019, 1 page.
English language abstract for CN207225059U extracted from espacenet.com database on Jan. 30, 2019, 1 page.
English language abstract for DE2404427C2 extracted from espacenet.com database on Jan. 30, 2019, 1 page.
English language abstract for DE3617688A1 extracted from espacenet.com database on Jan. 30, 2019, 1 page.
English language abstract for DE19739906A1 extracted from espacenet.com database on Jan. 30, 2019, 1 page.
English language abstract for DE102011088647A1 extracted from espacenet.com database on Jan. 30, 2019, 1 page.
English language abstract for DE102011088648A1 extracted from espacenet.com database on Jan. 30, 2019, 1 page.
English language abstract for DE1020122044717A1 extracted from espacenet.com database on Jan. 30, 2019, 1 page.
Computer-assisted English language abstract for DE102013214317A1 extracted from espacenet.com database on Jan. 30, 2019, 2 pages.
Computer-assisted English language abstract for DE102016203970A1 extracted from espacenet.com database on Jan. 30, 2019, 2 pages.
English language abstract for DE112016000937T5 extracted from espacenet.com database on Jan. 30, 2019, 2 pages.
Computer-assisted English language abstract for DE102016014508B3 extracted from espacenet.com database on Jan. 30, 2019, 2 pages.

(56) References Cited

OTHER PUBLICATIONS

Computer-assisted English language abstract for DE102016220630A1 extracted from espacenet.com database on Jan. 30, 2019, 3 pages.
English language abstract for EP0079455A1 extracted from espacenet.com database on Jan. 30, 2019, 2 pages.
English language abstract for FR3003813A1 extracted from espacenet.com database on Jan. 30, 2019, 1 page.
English language abstract for FR2976526B1 extracted from espacenet.com database on Jan. 30, 2019, 1 page.
English language abstract for JPS5757943A extracted from espacenet.com database on Jan. 30, 2019, 1 page.
English language abstract for JPH11240347A extracted from espacenet.com database on Jan. 30, 2019, 1 page.
English language abstract for JP2001025289A extracted from espacenet.com database on Jan. 30, 2019, 2 pages.
English language abstract for JP3674402B2 extracted from espacenet.com database on Jan. 30, 2019, 1 page.
English language abstract for JP2018054099Aom espacenet.com database on Jan. 30, 2019, 1 page.
English language abstract for KR101839168B1 extracted from espacenet.com database on Jan. 30, 2019, 1 page.
English language abstract for KR20180030234A extracted from espacenet.com database on Jan. 30, 2019, 1 page.
English language abstract for WO8804241A1 extracted from espacenet.com database on Jan. 30, 2019, 1 page.
English language abstract for WO2013170848A1 extracted from espacenet.com database on Jan. 30, 2019, 2 pages.
English language abstract for WO2014013084A1 extracted from espacenet.com database on Jan. 30, 2019, 2 pages.
English language abstract for WO2017207061A1 extracted from espacenet.com database on Jan. 30, 2019, 1 page.
English language abstract for WO2017215623A1 extracted from espacenet.com database on Jan. 30, 2019, 1 page.
English language abstract for WO2017216020A1 extracted from espacenet.com database on Jan. 30, 2019, 1 page.
English language abstract for WO2018001962A1 extracted from espacenet.com database on Jan. 30, 2019, 1 page.
English language abstract for WO2018059783A1 extracted from espacenet.com database on Jan. 30, 2019, 2 pages.
English language abstract for WO2018130101A1 extracted from espacenet.com database on Jan. 30, 2019, 2 pages.
International Search Report for Application No. PCT/US2017/031570 dated Jul. 20, 2017, 1 page.

\* cited by examiner

AXLE ASSEMBLY WITH ELECTRIC MOTOR

CROSS-REFERENCE TO RELATED APPLICATION(S)

The present application is the National Stage of International Patent Application No. PCT/US2017/031570 filed on May 8, 2017, which claims priority to and all of the advantages of U.S. Provisional Application No. 62/333,032 filed on May 6, 2016, the disclosure and contents of which are incorporated herein by reference in their entirety.

BACKGROUND OF THE INVENTION

1. Field of the Invention

The present invention relates generally to vehicle axles and, more particularly, to an axle assembly with an electric motor for a vehicle.

2. Description of the Related Art

Axles are commonly used in vehicles having wheels, such as passenger cars and/or trucks, mass transit vehicles such as city and/or commercial buses, agricultural vehicles, semi-trucks, trailers, and/or the like. Electric axles, i.e., axles having an electric motor, are increasing in popularity. However, given the limited amount of space under the vehicle floor, suitable and effective packaging of the electric motor and a clutch for the axle has become a challenge. The present disclosure is aimed at solving the challenge identified above.

SUMMARY OF THE INVENTION

The present invention provides a vehicle including a vehicle frame having front and rear ends and opposing first and second sides, a floor coupled to the vehicle frame and extending between the front and rear ends to define a length-wise axis adapted to extend along a length of the vehicle, the floor extending at least between the first and second sides to define a width-wise axis adapted to extend along a width of the vehicle, a first axle housing extending toward the first side of the vehicle frame and a second axle housing extending toward the second side of the vehicle frame, the first and second axle housings being aligned to define an axle axis parallel to the width-wise axis. The vehicle also includes a first wheel end coupled to the first axle housing adjacent the first side of the vehicle frame, a second wheel end coupled to the second axle housing adjacent the second side of the vehicle frame, and at least one drive shaft extending through the first axle housing and the second axle housing and coupled to the first and second wheel ends. The vehicle further includes a gearbox having a body with first and second portions defining a cavity with the first axle housing coupled to the first portion and the second axle housing coupled to the second portion such that the first axle housing and the second axle housing extend in opposing directions, and an electric motor coupled to the first portion of the body adjacent the first axle housing and extending away from the first portion to define a motor axis offset from the axle axis. The gearbox including a gear train having an input shaft with one end coupled to the electric motor and an opposite end rotatably attached to the gearbox and an output shaft rotatably coupled to the input shaft. The gear train further includes a clutch having a shifting fork movable between an engaged state and a disengaged state along a clutch axis parallel to the axle axis to couple the output shaft to the at least one drive shaft such that the electric motor drives the at least one drive shaft and to uncouple the output shaft from the at least one drive shaft such that the at least one drive shaft is able to rotate independently from the electric motor.

The present invention also provides an axle assembly for a vehicle having a vehicle frame including a first axle housing and a second axle housing adapted to extend toward opposing sides of the vehicle frame of the vehicle, a first wheel end coupled to the first axle housing and a second wheel end coupled to the second axle housing, and at least one drive shaft extending through the first axle housing and the second axle housing and coupled to the first and second wheel ends. The axle assembly also includes a gearbox having a body with first and second portions defining a cavity with the first axle housing coupled to the first portion and the second axle housing coupled to the second portion such that the first axle housing and the second axle housing extend in opposing directions. The axle assembly further includes an electric motor coupled to the first portion of the body adjacent the first axle housing and extending away from the first portion to define a motor axis offset from the axle axis. The gearbox includes a gear train having an input shaft with one end coupled to the electric motor and an opposite end rotatably attached to the gearbox and an output shaft rotatably coupled to the input shaft. The gear train further includes a clutch having a shifting fork movable between an engaged state and a disengaged state along a clutch axis parallel to the axle axis to couple the output shaft to the at least one drive shaft such that the electric motor drives the at least one drive shaft and to uncouple the output shaft from the at least one drive shaft such that the at least one drive shaft is able to rotate independently from the electric motor.

The advantages of the present invention will be readily appreciated as the same becomes better understood by reference to the following detailed description when considered in connection with the accompanying drawings.

DETAILED DESCRIPTION OF THE INVENTION

Figure 1:
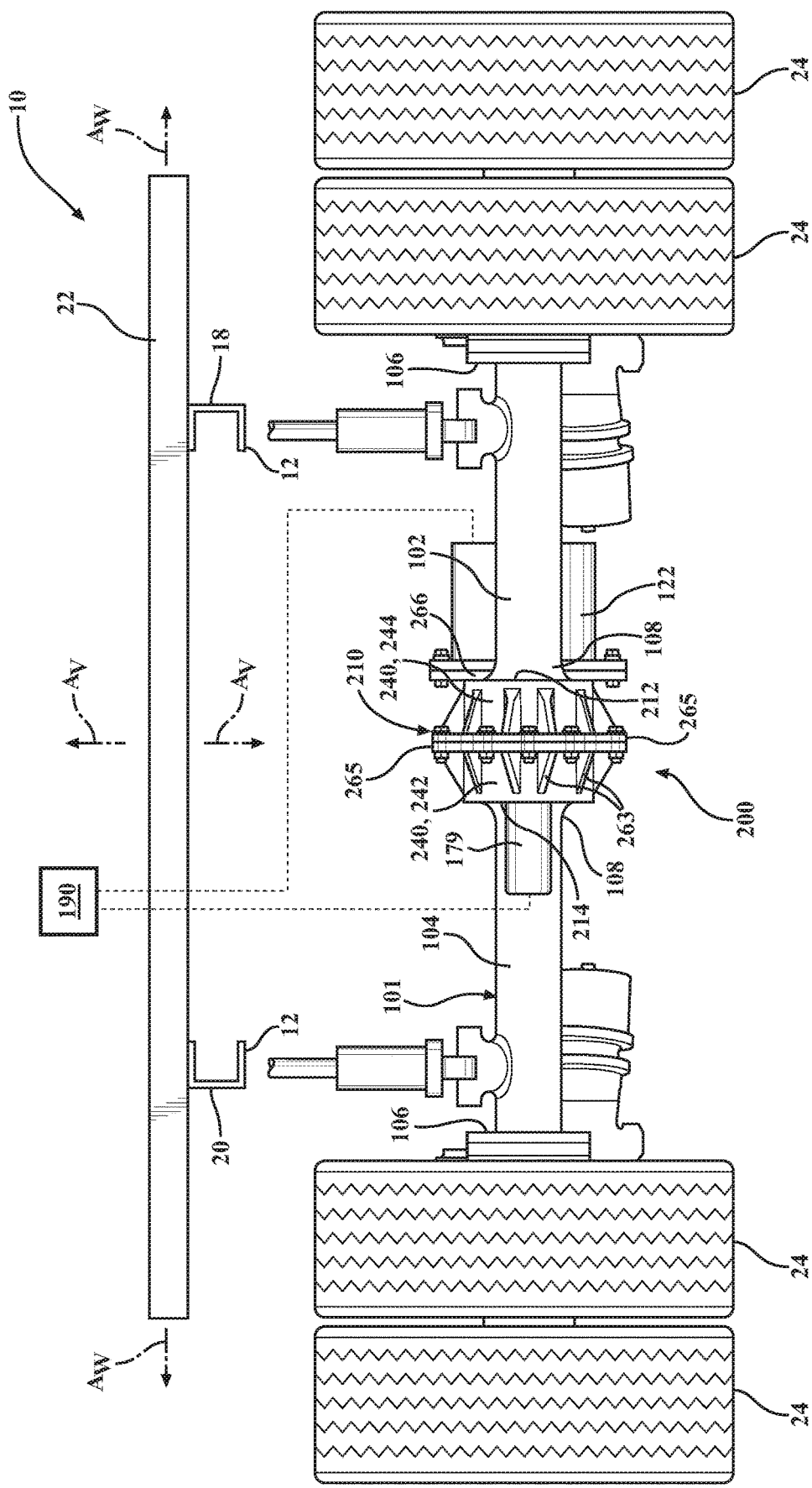
FIG. 1 is an elevational view of a portion of a vehicle illustrating a vehicle frame supporting a vehicle floor bottom of a trailer having an axle assembly according to one embodiment of the present invention.

Referring now to the figures, wherein like numerals indicate corresponding parts throughout the several views, one embodiment of an axle assembly 200, according to the present invention, is shown throughout the figures and are described in detail below. In one embodiment, the axle assembly 200 is a trailer axle for a trailer pulled by a vehicle (not shown). The axle assembly 200 includes a motor 122 coupled to a gearbox or dropbox 210 to be described, which is, in turn, selectively coupled to wheels 24 of a trailer or vehicle 10. While the exemplary trailer or vehicle 10 includes only one axle assembly 200 and corresponding motor 122, it is contemplated that the trailer or vehicle 10 can have multiple axle assemblies 200 and corresponding motors 122 selectively providing equal amounts of power to each one of the corresponding wheels 24. It is also contemplated that the motors 122 can instead provide unequal amounts of power to the wheels 24 when, for example, it is determined that one or more of the wheels 24 have lost traction with the road. It should be appreciated that the axle assembly 200 is a rigid axle for any type of vehicle. Non-limiting examples of the vehicle include a mass transit vehicle (such as a city bus, a commercial bus, a trolley vehicle, etc.), a school bus, a commercial semi-truck and associated trailers, an agricultural vehicle, a passenger car or truck, and/or the like. If used on a trailer, the trailer may be coupled to a semi-truck and may have a plurality of axle assemblies 200. In other embodiments, the axle assembly 200 may also include a planetary, may be part of a tandem axle, may be an axle having an independent suspension and/or may have a variety of additional features.

Figure 2:
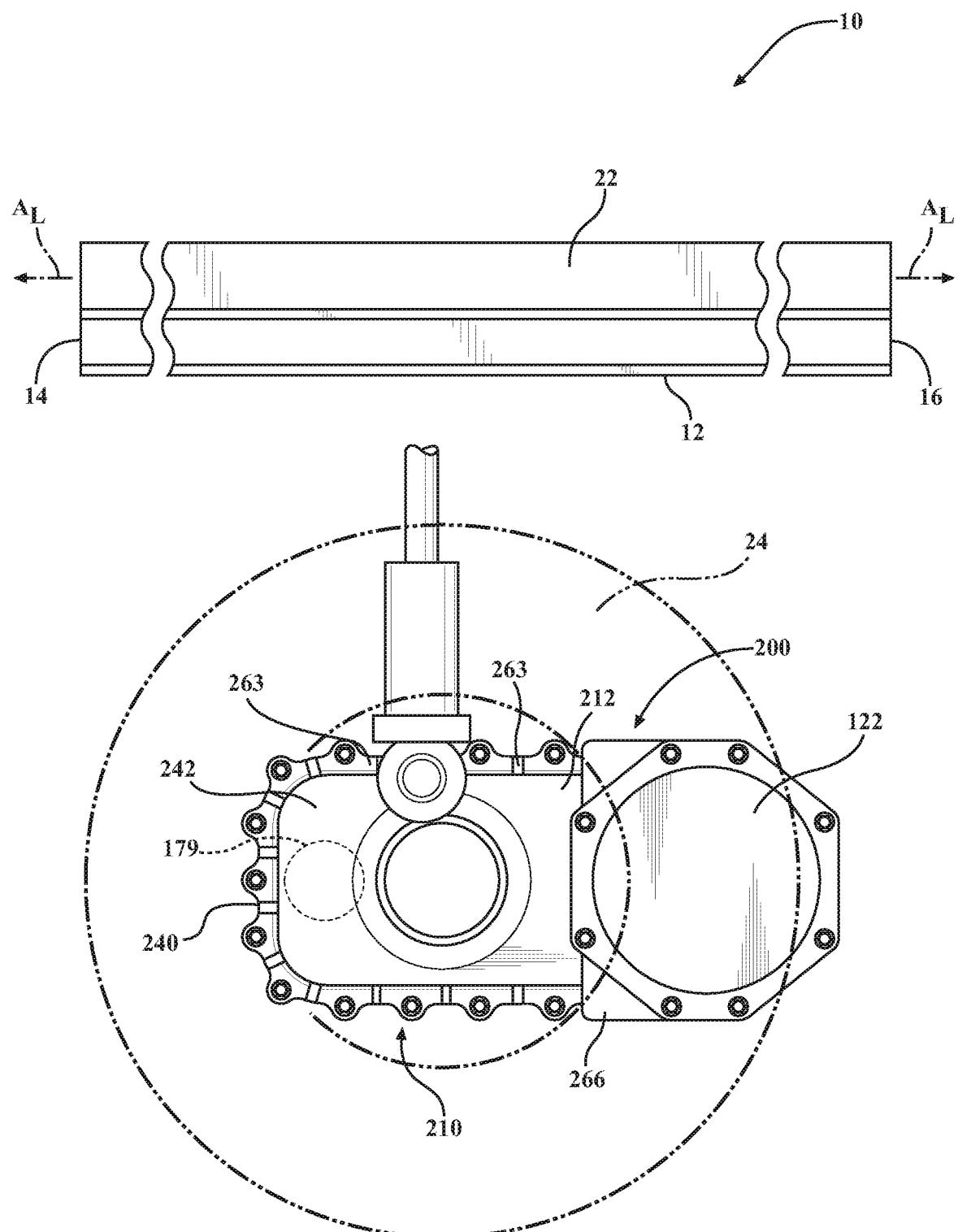
FIG. 2 is a semi-schematic rear view of a portion of the vehicle illustrating the vehicle frame and the axle assembly illustrated in FIG. 1.
Figure 3:
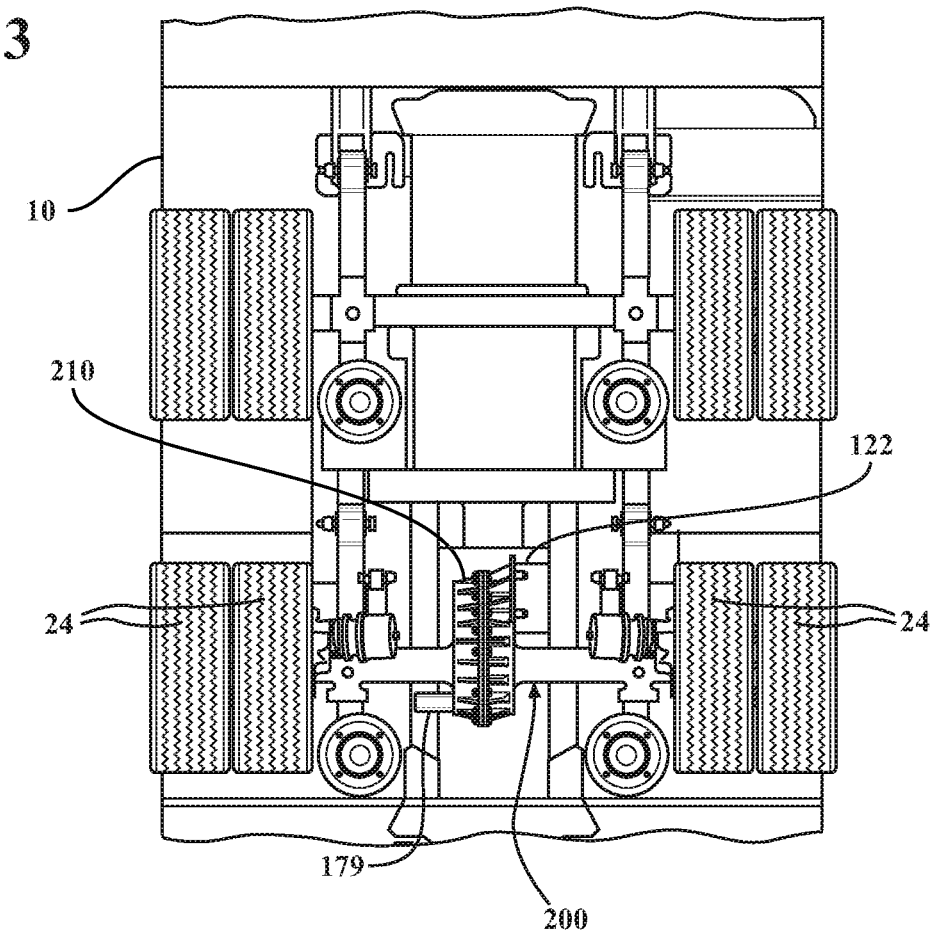
FIG. 3 is a bottom plan view of the axle assembly for the vehicle illustrated in FIG. 1.
Figure 4:
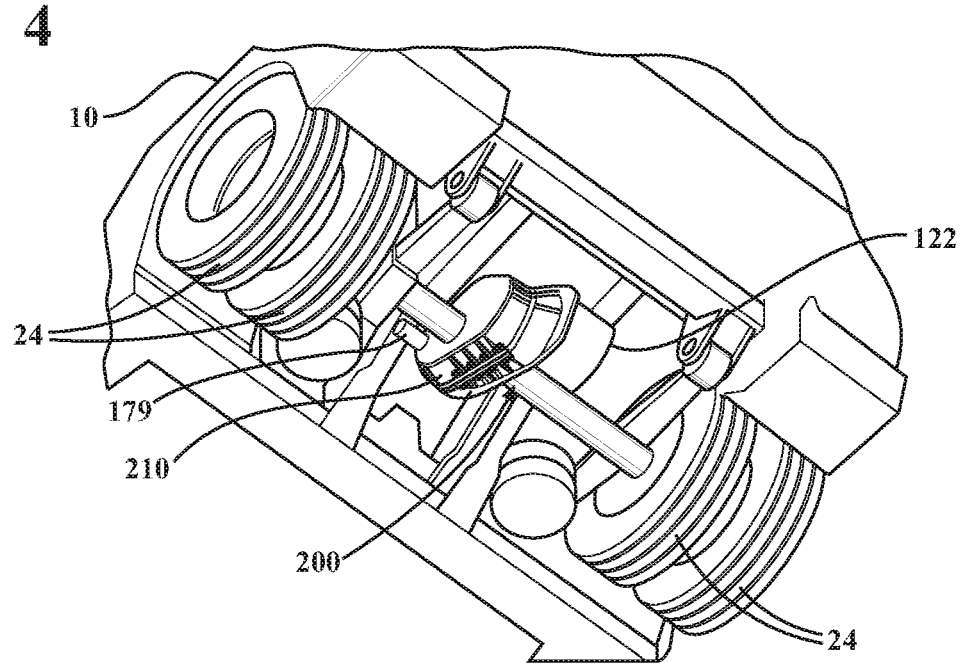
FIG. 4 is a perspective view of the axle assembly of FIG. 3.
Figure 5:
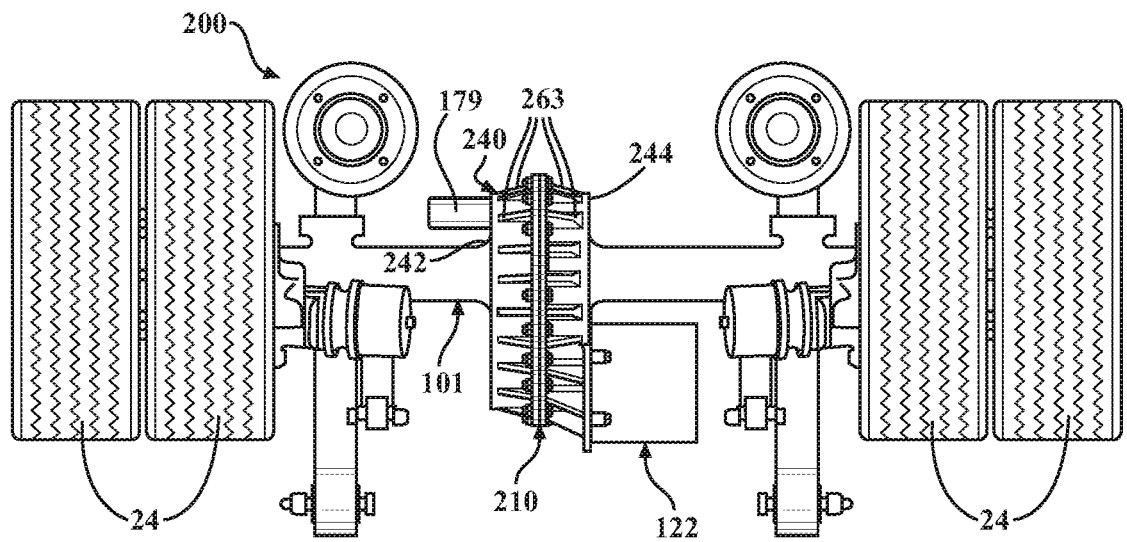
FIG. 5 is a bottom plan view of the axle assembly of FIG. 3.
Figure 6:
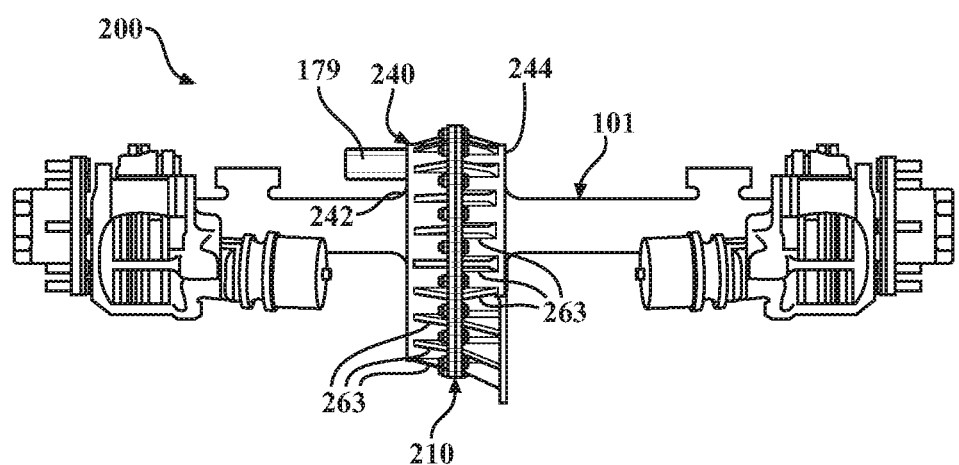
FIG. 6 is a top plan view of the axle assembly of FIG. 3, without the wheels and the motor.

FIGS. 1 and 2 semi-schematically illustrate a portion of the trailer or vehicle 10 including the axle assembly 200. The trailer or vehicle 10 includes a chassis having a vehicle frame 12. The vehicle frame 12 has front 14 and rear 16 ends and opposing first 18 and second 20 sides. The vehicle 10 further includes a floor 22 coupled to the vehicle frame 12 and extending between the front 14 and rear 16 ends to define a longitudinal axis $A_L$ adapted to extend along a length of the vehicle 10. The floor 22 further extends at least between the first 18 and second 20 sides to define a width-wise axis $A_W$ adapted to extend along a width of the vehicle 10. The vehicle frame 12 and the floor 22 are schematically illustrated in FIGS. 1 and 2, and the vehicle frame 12 may therefore be larger or smaller in the width-wise direction (i.e., along the width-wise axis $A_W$). Accordingly, the floor 22 may extend between the first 18 and second 20 sides of the vehicle frame 12 or beyond the first 18 and second 20 sides of the vehicle frame 12.

The axle assembly 200 includes a housing 101 having first 102 and second 104 axle housings, and at least one drive shaft 150 to be described disposed at least partially within the respective first 102 and second 104 axle housings. The first 102 and second 104 axle housings are coupled to a gearbox 210 and are shown schematically in the figures, as the first 102 and second 104 axle housings can be coupled to the gearbox 210 in any suitable manner. In one embodiment, the first 102 and second 104 axle housings are mirror-images of one another. The axle assembly 200 further includes first 216 and second 218 wheel ends, with the first wheel end 216 coupled a first housing end 106 of the first axle housing 102 and the second wheel end 218 coupled to a first housing end 106 of the second axle housing 102. The axle housings 102, 104 may be made of or include any suitable material. It should be appreciated that each of the first 216 and second 218 wheel ends may or may not include any gears or a gear reduction. Further, the first 216 and second 218 wheel ends may be part of a non-steer axle or a steerable axle.

Each of the first 216 and second 218 wheel ends is coupled to at least one vehicle wheel or tire 24. Each of the first 216 and second 218 wheel ends may also have a plurality of gears, such as a planetary gear set (not shown) including a gear ratio. The transmission is given to the wheels 24 by a reduction inside the respective wheel ends 216, 218, including the gear ratio.

The axle assembly 200 includes an electric motor 122. In one embodiment, the electric motor 122 coupled to the first housing 102. Utilizing power generated by the electric motor 122, the first 216 and second 218 wheel ends enable rotational motion of the wheel(s) 24 in a forward direction causing the trailer or vehicle 10 to move forwards or in a backward direction causing the trailer or vehicle 10 to move backwards. In one embodiment, each of the wheel ends 216, 218 may also include a dry disk brake.

Figure 8:
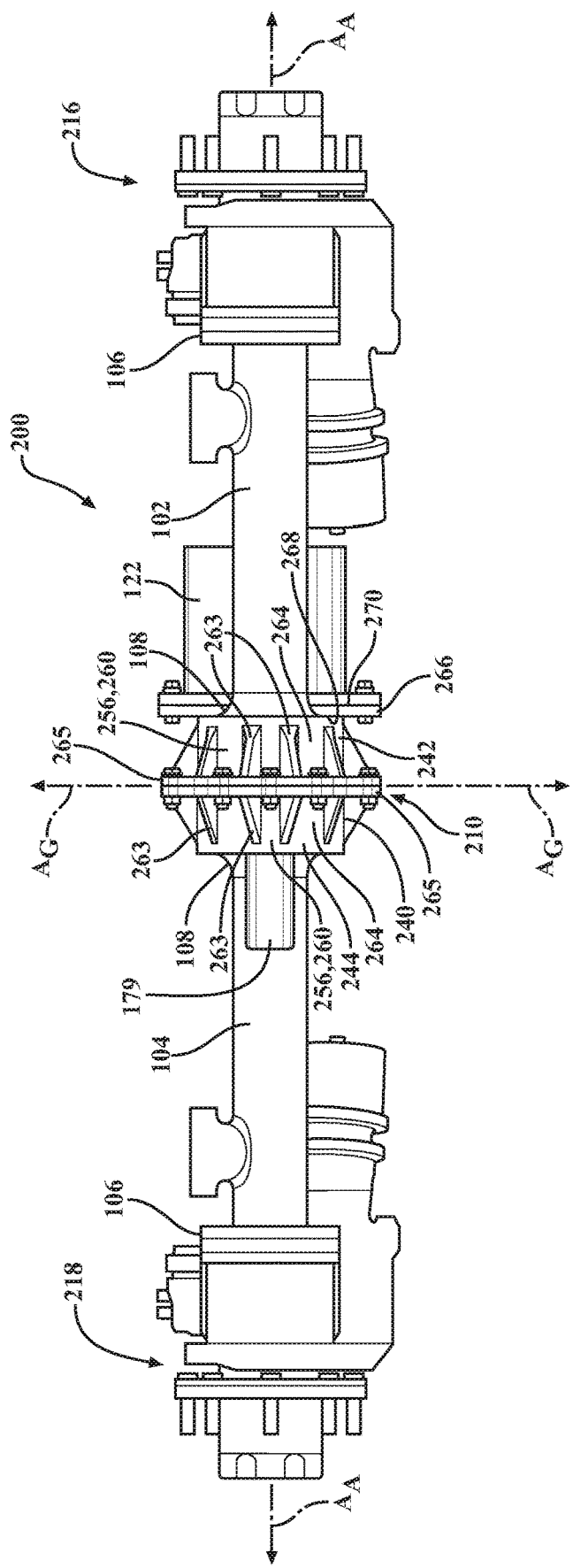
FIG. 8 is a front elevational view of the axle assembly of FIG. 7.

The axle assembly 200 further includes the gearbox or dropbox 210 having a body 240. The body 240 has a first surface 212 facing the first side 18 of the vehicle frame 12 and a second surface 214 facing the second side 20 of the vehicle frame 12. As shown, the first axle housing 102 is coupled to the first surface 212 of the body 240, and the second axle housing 104 is coupled to the second surface 214 of the body 240. In addition, the gearbox 210 is cantilevered outwardly relative to the aligned first 102 and second 104 axle housings to define a gearbox axis $A_G$ parallel to the longitudinal axis $A_L$ and transverse to an axle axis $A_A$ (FIG. 8). The gearbox 210 is also spaced vertically downward from the floor 22 of the vehicle or trailer 10 along a vertical axis $A_V$ perpendicular to and intersecting both of the axle axis $A_A$ and the gearbox axis $A_G$.

The body 240 of the gearbox 210 has multiple portions. In this embodiment, the body 240 has a first portion 242 and a second portion 244. The first 242 and second 244 portions are substantially equal to define a cavity 246 for receiving a gear set or gear train 153 to be described. Each of the first 242 and second 244 portions of the body 240 defines the cavity 246, where part of the cavity 246 is defined in the first portion 242 and the another part of the cavity 246 is defined in the second portion 244. It is contemplated that the body 240 of the gearbox 210 can be of any symmetrical or asymmetrical configuration and be made from any suitable material, not limited to metals and/or metal alloys.

The body 240 of the gearbox 210 may have any suitable shape. In one embodiment, the body 240 has an oblong shape, which may resemble an oval shape or a rectangular shape with soft or rounded edges. In addition, each of the first 242 and second 244 portions of the body 240 define a side wall 256 having an interior surface. The interior surfaces of the first 242 and second 244 portions collectively define the cavity 246 for receiving the gear train 153. The cavity 246 may have any suitable size/depth for housing the gear train 153. The shape of the cavity 246 is also not particularly limited.

The side walls 256 of the first 242 and second 244 portions define an exterior surface 260 of the body 240 of the gearbox 210. In one embodiment, the body 240 has a plurality of body ribs 263, with the body ribs 263 being formed on the exterior surface 260 of the body 240. In particular, the body ribs 263 are formed on the side walls 256 of both the first 242 and second 244 portions of the body 240. The body ribs 263 may have any shape, such a wedge shape as shown. Alternatively, the body ribs 263 may have a rounded shape, a polygonal shape, and/or combinations thereof. The body ribs 263 are spaced from one another, and are distributed along the entire side wall 256 of each of the portions 242, 244. In one embodiment, a body rib 263 formed on the side wall 256 of the first portion 242 is aligned with a body rib 263 formed on the side wall 256 of the second portion 244.

The body ribs 263 may have any size, at least in terms of the width defined across each body rib 263. Each body rib 263 may extend entirely or partially along the height of the side wall 256 of each of the portions 242, 244. In one embodiment, and as shown, the body ribs 263 extend along the entire height of the side wall 256 of the first portion 242, while the body ribs 263 extend partially along the height of the side wall 256 of the second portion 244. In addition, the body ribs 263 may be substantially the same in terms of shape and size. Alternatively, the body ribs 263 may be different, where one or more body ribs 263 may be different at least in terms of shape and size from another body rib 263.

Each of the first 242 and second 244 portions of the body 240 has a perimeter 264, which is defined by the exterior surface 260 of the portions 242, 244. In addition, each of the portions 242, 244 has a lip 265, and the lips 265 are aligned for coupling the first portion 242 with the second portion 244 such as, for example, with a plurality of fasteners.

The first portion 242 of the body 240 further has a flange 266 extending outwardly from the perimeter 264 of the first portion 242. In one embodiment, the flange 266 has a larger surface area than the first portion 242 and provides additional strength to the gearbox 210 so that the gearbox 210 can suitably hold and/or support the electric motor 122 that is cantilevered from the gearbox 210. In one embodiment, the flange 266 in combination with the body ribs 263 on the side walls 256 of the first 242 and second 244 portions of the body 240 provides additional strength to the gearbox 210 so that the gearbox 210 can suitably hold and/or support the electric motor 122 that is cantilevered from the gearbox 210.

Figure 7:
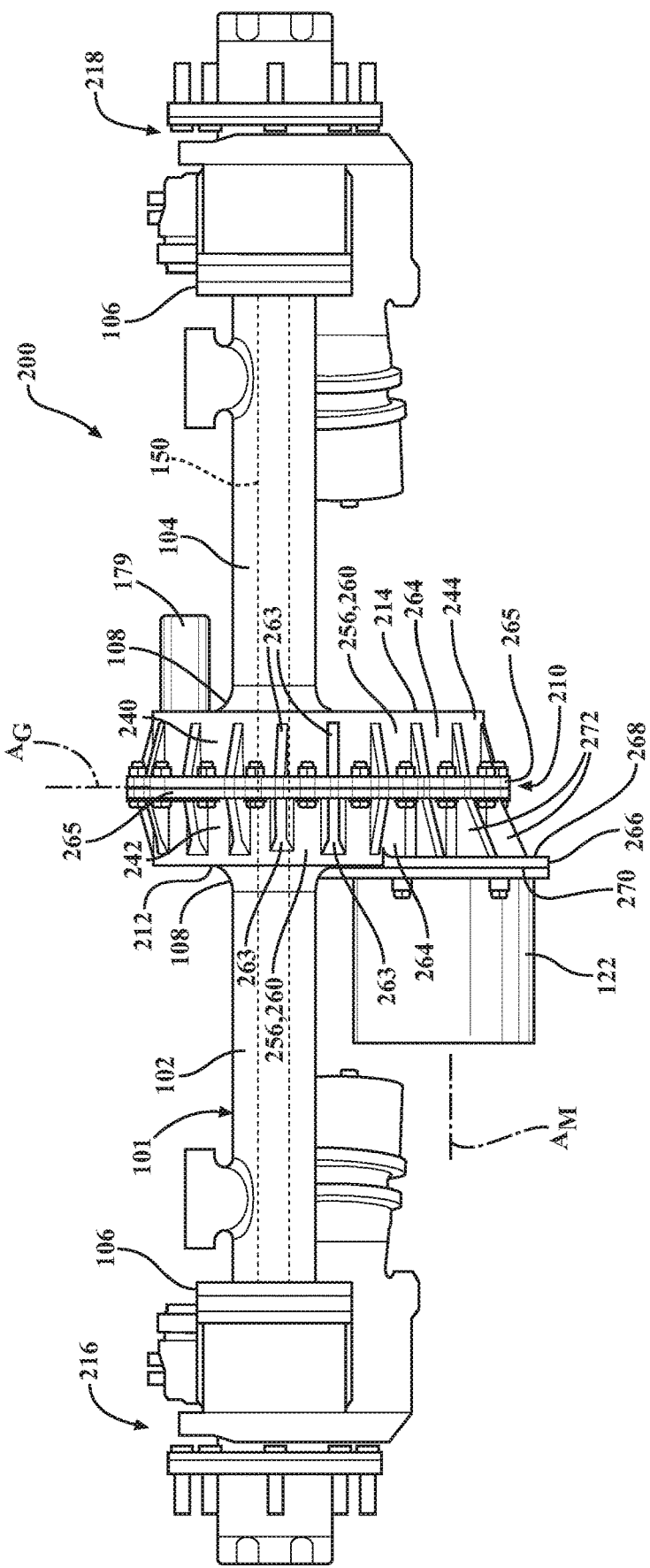
FIG. 7 is a rear elevational view of the axle assembly of FIG. 3, without the wheels.

As shown in FIG. 7, the flange 266 has first 268 and second 270 opposing flange surfaces, with the first flange surface 268 of the flange 266 adjacent to the body ribs 263 on the side wall 256 of first portion 242 of the body 240. The second flange surface 270 of the flange 266 provides a coupling surface for the electric motor 122, and when assembled, the second flange surface 270 of the flange 266 is adjacent to the electric motor 122. The flange 266 may be made of or includes any suitable material, not limited to metals and metal alloys. In one embodiment, the flange 266 is made of or includes the same material as the body 240 of the gearbox 210.

The gearbox 110 further has a support rib 272 directly coupling the flange 266 to the body 240. In another embodiment, the gearbox 210 further has a plurality of support ribs 272 with each support rib 272 directly coupling the flange 266 to the body 240. Each of the support rib(s) 272 may have any suitable shape and size, and is typically larger than one of the body ribs 263. The support rib(s) 272 may extend along the entire height of the side wall 256 of the first portion 242 of the body 240.

The support rib(s) 272 may have any suitable shape. In one embodiment, and as shown, the support ribs 272 have a wedge shape, with the larger end of the wedge adjacent the flange 266. The support ribs 272 may be substantially the same in terms of shape and size, or may be different. If different, one of the support ribs 272 may be different at least in terms of shape and size from another support rib 272. In addition, the support ribs 272 may be distributed in selected positions along a portion of the perimeter 264 of the body 260.

As illustrated in FIG. 7, the axle assembly 200 includes at least one drive shaft 150 disposed through the housing 101. In one embodiment, the drive shaft 150 is a cardan drive shaft. However, it is contemplated that the drive shaft 150 may be any other mechanical component for transmitting torque and rotation including but not limited to a drive shaft or a propeller shaft. The drive shaft 150 is configured to rotate when activated by the electric motor 122 without engaging or otherwise rotating the housing 101. Moreover, the drive shaft 150 is configured to transmit torque and rotation from the electric motor 122 to the wheels 24 to propel the trailer or vehicle 10. In the embodiment shown in FIG. 7, the drive shaft 150 is a single shaft disposed through both the first housing 102 and the second housing 104 of the housing 101 and configured to couple the wheel ends 216, 218 disposed on opposite sides of the axle assembly 200.

In another embodiment, the drive shaft 150 includes first and second drive shafts. The first drive shaft is at least partially disposed within the first axle housing 102 and coupled to the first wheel end 216, and the second drive shaft is at least partially disposed within the second axle housing 104 and coupled to the second wheel end 218. For example, a portion of the first drive shaft may be disposed through the first axle housing 102, and a remaining portion of the first drive shaft may be disposed within the gearbox 210. Likewise, a portion of the second drive shaft may be disposed through the second axle housing 104, and a remaining portion of the second drive shaft may be disposed within the gearbox 210. Each of the first and second drive shafts have first and second shaft ends. Each of the first shaft ends is coupled to the gear train 153 disposed within the gearbox 210, and each of the second shaft ends is coupled to the first 216 and second 218 wheel ends, respectively. The drive shafts deliver power (generated by the electric motor 122) from the gear train 153 in the gearbox 210 to the wheels 24 of the vehicle 10. Typically, the first and second drive shafts rotate within the respective first 102 and second 104 axle housings when powered or activated by the electric motor 122 without engaging or otherwise rotating the axle housings 102, 104.

The first and second drive shafts can be any suitable drive or propeller shaft. In one embodiment, each of the first and second drive shafts is a cardan shaft. It should be appreciated that the drive shafts can be any mechanical component that can suitably transmit torque and rotation and/or deliver power to the wheels 24, and is not limited to a drive or propeller shaft.

In one embodiment, the axle assembly 200 further includes a differential (not shown) disposed between the first and second drive shafts. The differential is coupled to the drive shafts and allows each of the wheel ends 216, 218 to rotate at different speeds. This facilitates handling of the trailer or vehicle 10, such as by enabling ease of turning the trailer or vehicle 10. For instance, when the trailer or vehicle 10 is turning, the differential allows the wheel(s) 24 coupled to the wheel end 216, 218 at one side of the trailer or vehicle 10 to rotate faster than the wheel(s) 24 coupled to the other wheel end 216, 218 at the other side of the trailer or vehicle 10.

In one embodiment, the differential is at least partially disposed within the gearbox 210. The gearbox 210 may be centrally or substantially centrally located between the first 216 and second 218 wheel ends. With this configuration, the gearbox 210 forms a central portion of the axle assembly 200. It is to be understood that the gearbox 210 is schematically or semi-schematically shown in the figures, and therefore certain features of the gearbox 210 are not shown.

Figure 9:
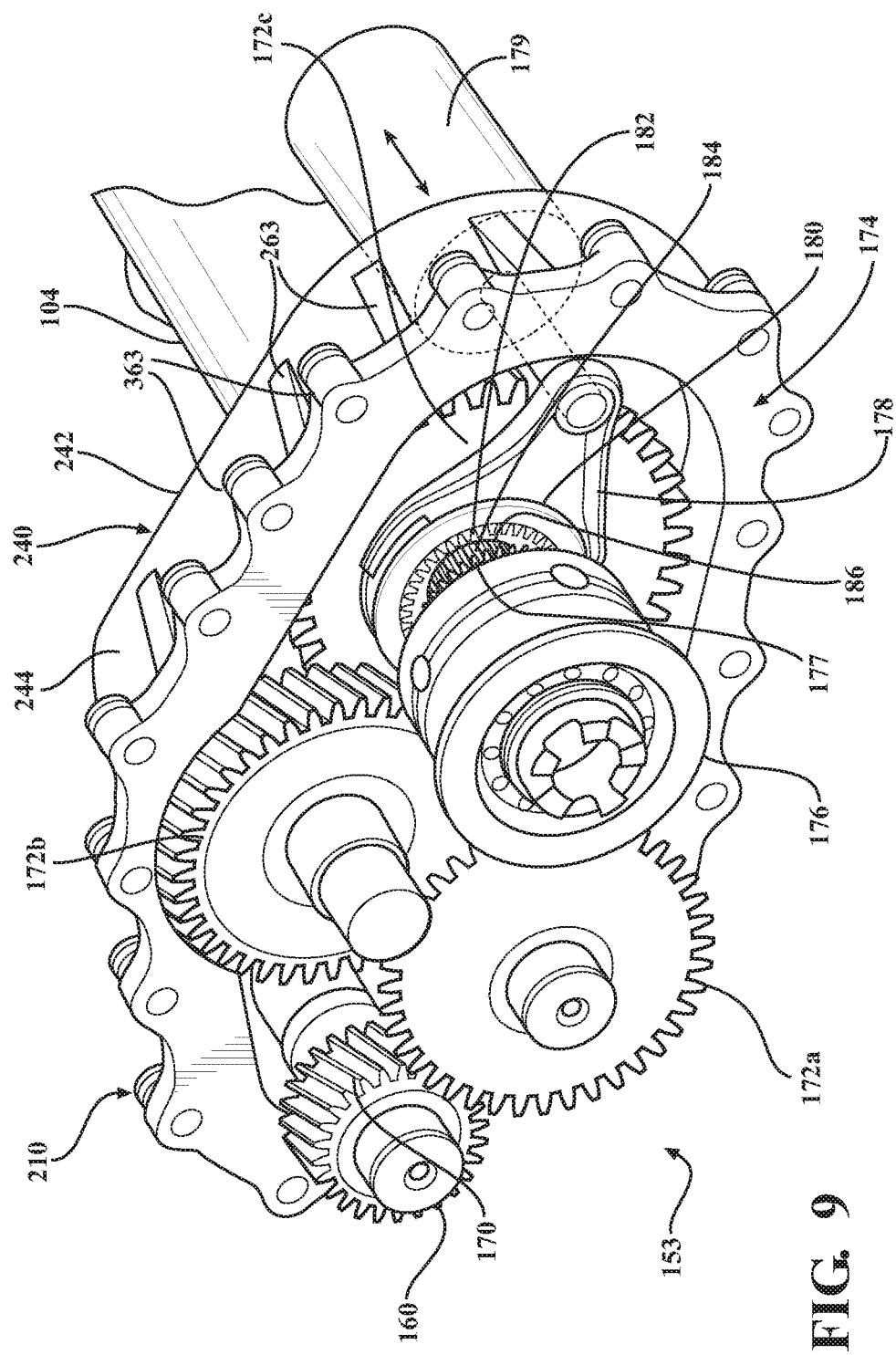
FIG. 9 is an enlarged perspective view of a portion of a gearbox of the axle assembly illustrated in FIGS. 6-8.
Figure 10:
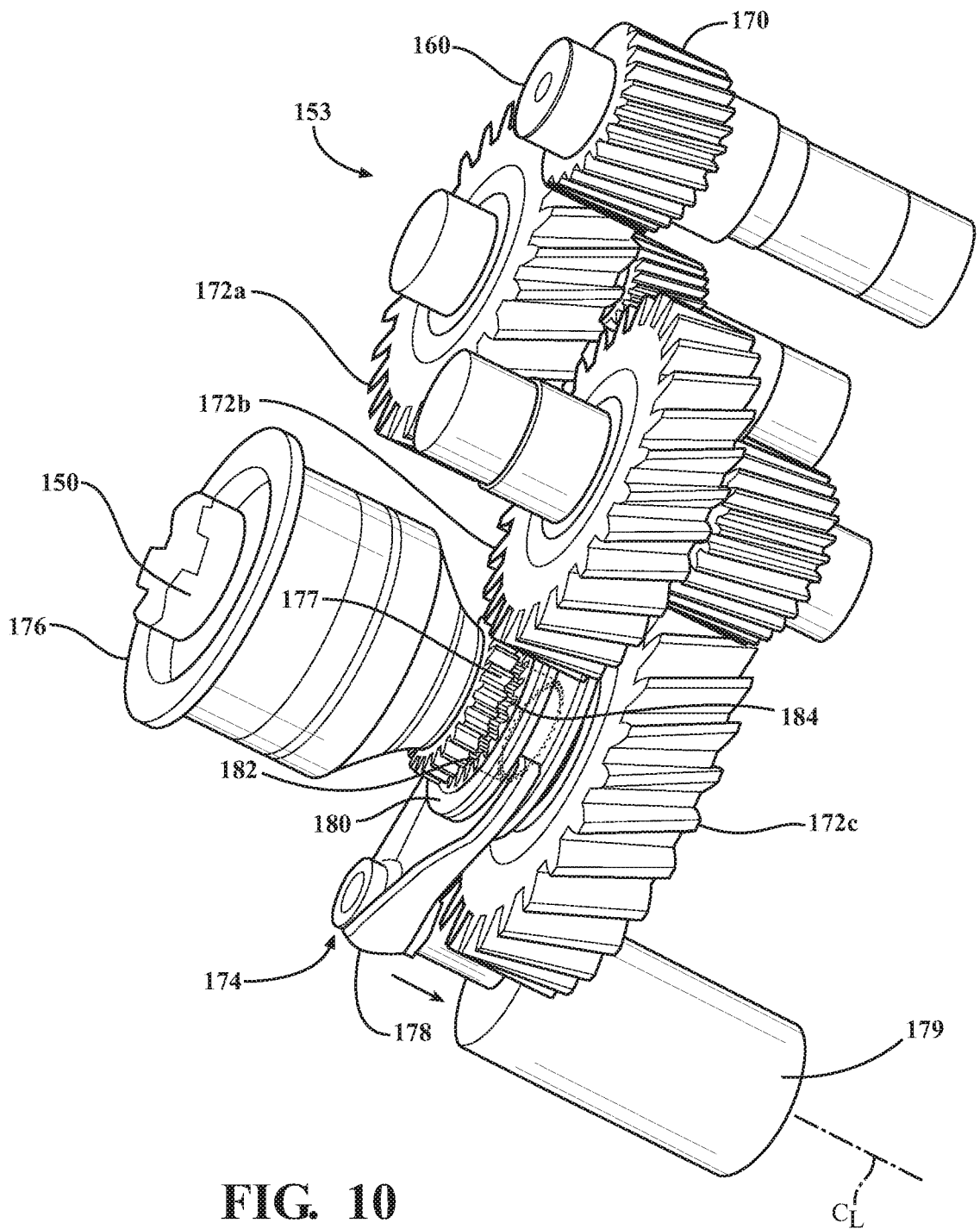
FIG. 10 is an enlarged perspective view of a portion of the gearbox shown in FIG. 9, illustrating a gear train of the gearbox having a clutch in a disengaged state.
Figure 11:
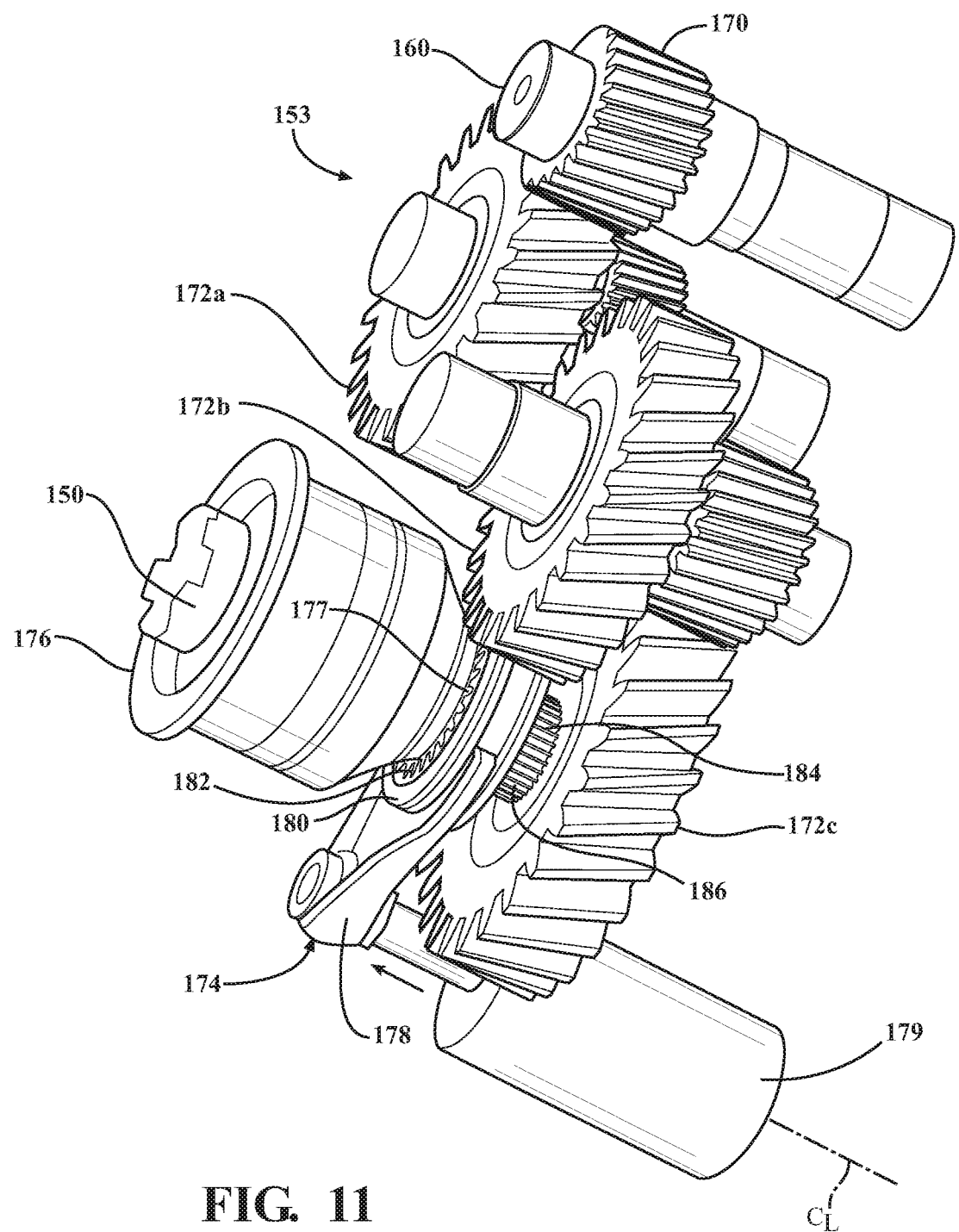
FIG. 11 is a view similar to FIG. 10 illustrating the clutch in an engaged state for selectively engaging a motor to wheels of the vehicle such that the motor provides power to the wheels.

Referring to FIGS. 9-11, the gearbox 210 includes a gear set or gear train 153 including an input shaft 160. The input shaft 160 can include one end coupled to the electric motor 122 by, for example, a press fitting. Furthermore, the input shaft 160 can include an opposite end, which is rotatably attached to the gearbox 210 and includes a plurality of external splines 170. The gear train 153 includes a plurality of gears. In one embodiment, the gears include a first gear 172a, such as a first compound gear, coupled to the external splines 170 of the input shaft 160 and to a second gear 172b, such as a second compound gear, which is in turn coupled to a third gear 172c. The gear train 153 also includes an output shaft 186 having a plurality of external splines 184 coupled to the third gear 172c to rotatably couple the output shaft 186 to the input shaft 160. It is to be appreciated that the illustrated gear train 153 is of only one suitable example and may include any number of gears, including a planetary gear set, depending on the application.

This exemplary gear train 153 further includes a clutch 174 movable between an engaged state and a disengaged state. In the engaged state, the clutch 174 couples the output shaft 186 and a fitting 176 for the drive shaft 150 to one another such that the electric motor 122 provides power to the drive shaft 150. In the disengaged state, the clutch 174 is coupled to the output shaft 186 and allows the drive shaft 150 to free-wheel or rotate freely or independently of the electric motor 122. The fitting 176 includes a plurality of external dog teeth or splines 177. In one example, the clutch 174 may be moved to the engaged state when the trailer or vehicle 10 starts moving from a resting stop or otherwise travels below a threshold speed such that the electric motor 122 supplements the power of the vehicle for pulling the trailer or vehicle 10. In the disengaged state, the output shaft 186 and the fitting 176 of the drive shaft 150 are not coupled to one another, such that the drive shaft 150 rotates independently of the electric motor 122. Continuing with the previous example, the clutch 174 may be moved to the disengaged state when, for example, the vehicle and/or trailer are traveling above a threshold speed and/or at a cruising speed.

Referring to FIGS. 9-11, one embodiment of the clutch 174 includes a shifting fork 178 and an actuator 179 coupled to the shifting fork 178 for moving between the engaged and disengaged states along a clutch axis $C_L$. The actuator 179 may be of an electric type. In one embodiment, the actuator 179 is coupled to the gearbox 210. It is to be appreciated that the actuator is shown schematically and may be of any suitable type or configuration, and may be mounted to the gearbox 210 is any suitable manner.

The clutch 174 further includes a collar 180, which is carried by the shifting fork 178 along the clutch axis $C_L$ parallel to the axle axis $A_A$ between the engaged and disengaged states to couple the output shaft 186 to the drive shaft 150 such that the electric motor 122 drives the drive shaft 150 and to uncouple the output shaft 186 from the drive shaft 150 such that the drive shaft 150 is able to rotate independently from the electric motor (122). The collar 180 includes a plurality of internal dog teeth or splines 182 having a first portion to engage and disengage the external splines 177 of the fitting 176 and a second portion engaging the external splines 184 of the output shaft 186. In this embodiment, the external splines 184 of the output shaft 186 have a smaller diameter than the external splines 177 on the fitting 176. It should be appreciated that the clutch may be of any suitable design, type or configuration and is shown somewhat schematically for illustrative purposes.

One or more power source(s) and/or controller(s) 190 (FIG. 1) is electrically connected to the electric motor 122 and the actuator 179 to supply power and control signals to activate and deactivate the electric motor 122 and the actuator 179 under predetermined conditions.

Referring to FIG. 10, in the disengaged state, the internal splines 182 of the collar 180 only engage external splines 184 extending from the output shaft 186. This allows the output shaft 186 to be disconnected such that the drive shaft 150 rotates freely or independently of the electric motor 122. It should be appreciated that the drive shaft 150 extends all the way through the gearbox 210 and the second axle housing 104. It should also be appreciated that the drive shaft 150 rotates freely or free-wheeling during the disengaged state.

Referring to FIG. 11, in the engaged state, the shifting fork 178 is moved by the actuator 179 to a position such that one portion of the internal splines 182 of the collar 180 engages the external splines 184 of the output shaft 186 and another portion of the internal splines 182 engages the external splines 177 of the fitting 176 for the drive shaft 150 of the axle assembly 200, such that the output shaft 186 and the drive shaft 150 move together in synchronous rotation. This allows the electric motor 122 to power the drive shaft 150 and, in turn, the wheels 24. It should be appreciated that the electric motor 122 is a sole source of power to rotate the drive shaft 150 during the engaged state. It should also be appreciated that notwithstanding the examples as described above, it is contemplated that the gearbox 210 can have any suitable engagement arrangement or gear train and corresponding clutch for selectively coupling the electric motor 122 to the drive shaft 150.

The present invention has been described in illustrated manner. It is to be understood that the terminology which has been used is intended to be in the nature of words of description rather than limitation. It is now apparent to those skilled in the art that many modifications and variations of the present invention are possible in light of the above teachings. It is therefore to be understood that the present invention may be practiced otherwise than as specifically described.

What is claimed is:

1. A vehicle comprising:
 a vehicle frame having front and rear ends and opposing first and second sides;
 a floor coupled to said vehicle frame and extending between said front and rear ends to define a length-wise axis adapted to extend along a length of the vehicle, said floor extending at least between said first and second sides to define a width-wise axis adapted to extend along a width of the vehicle;
 a first axle housing extending toward said first side of said vehicle frame and a second axle housing extending toward said second side of said vehicle frame, said first and second axle housings being aligned to define an axle axis parallel to said width-wise axis;
 a first wheel end coupled to said first axle housing adjacent said first side of said vehicle frame;
 a second wheel end coupled to said second axle housing adjacent said second side of said vehicle frame;

a drive shaft extending through said first axle housing and said second axle housing and coupled to said first and second wheel ends;

a gearbox having a body with first and second portions defining a cavity with said first axle housing coupled to said first portion and said second axle housing coupled to said second portion such that said first axle housing and said second axle housing extend in opposing directions;

an electric motor coupled to said first portion of said body adjacent said first axle housing and extending away from said first portion to define a motor axis offset from said axle axis;

said gearbox including a gear train having an input shaft with one end coupled to said electric motor and an opposite end rotatably attached to said gearbox and an output shaft rotatably coupled to said input shaft; and said gear train further including a clutch comprising a shifting fork movable between an engaged state and a disengaged state along a clutch axis parallel to said axle axis to couple said output shaft to said drive shaft such that said electric motor drives said drive shaft and to uncouple said output shaft from said drive shaft such that said drive shaft is able to rotate independently from said electric motor.

2. The vehicle as set forth in claim 1 wherein said electric motor is a sole source of power to rotate said drive shaft.

3. The vehicle as set forth in claim 1 wherein said drive shaft rotates freely during said disengaged state.

4. The vehicle as set forth in claim 1 further including an actuator coupled to said gearbox and said shifting fork for moving said shifting fork between said engaged state and said disengaged state.

5. The vehicle as set forth in claim 1 wherein said gear train comprises a first gear coupled to said input shaft, a second gear coupled to said first gear, and an output gear coupled to said output shaft and said second gear.

6. The vehicle as set forth in claim 1 wherein said drive shaft includes a fitting having a plurality of first external splines.

7. The vehicle as set forth in claim 6 wherein said output shaft includes a plurality of second external splines.

8. The vehicle as set forth in claim 7 wherein said clutch includes a collar carried by said shifting fork along said clutch axis between said engaged state and said disengaged state.

9. The vehicle as set forth in claim 8 wherein said collar comprises a plurality of internal splines engaging said second external splines and being spaced from said first external splines of said fitting when in said disengaged state such that said electric motor and said fitting are not coupled to one another to allow the wheels of the vehicle to rotate independently of said electric motor.

10. The vehicle as set forth in claim 9 wherein said internal splines have a first portion that engages said second external splines of said output shaft and a second portion that engages with said first external splines of said fitting such that, in said engaged state, said clutch couples said output shaft and said fitting to one another such that said electric motor provides power to said drive shaft.

11. The vehicle as set forth in claim 1 wherein said gearbox is cantilevered relative to said first axle housing and said second axle housing to define a gearbox axis transverse to said axle axis.

12. The vehicle as set forth in claim 11 wherein said motor axis is transverse to said gearbox axis.

13. The vehicle as set forth in claim 1 wherein said motor axis is parallel to said axle axis.

14. An axle assembly for a vehicle having a vehicle frame comprising:

a first axle housing and a second axle housing adapted to extend toward opposing sides of the vehicle frame of the vehicle, said first and second axle housings being aligned to define an axle axis;

a first wheel end coupled to said first axle housing and a second wheel end coupled to said second axle housing;

a drive shaft extending through said first axle housing and said second axle housing and coupled to said first and second wheel ends;

a gearbox having a body with first and second portions defining a cavity with said first axle housing coupled to said first portion and said second axle housing coupled to said second portion such that said first axle housing and said second axle housing extend in opposing directions;

an electric motor coupled to said first portion of said body adjacent said first axle housing and extending away from said first portion to define a motor axis offset from said axle axis;

said gearbox including a gear train having an input shaft with one end coupled to said electric motor and an opposite end rotatably attached to said gearbox and an output shaft rotatably coupled to said input shaft; and said gear train further including a clutch comprising a shifting fork movable between an engaged state and a disengaged state along a clutch axis parallel to said axle axis to couple said output shaft to said drive shaft such that said electric motor drives said drive shaft and to uncouple said output shaft from said drive shaft such that said drive shaft is able to rotate independently from said electric motor.

15. The axle assembly as set forth in claim 14 wherein said electric motor is a sole source of power to rotate said drive shaft.

16. The axle assembly as set forth in claim 14 wherein said drive shaft rotates freely during said disengaged state.

17. The axle assembly as set forth in claim 14 further including an actuator coupled to said gearbox and said shifting fork for moving said shifting fork between said engaged state and said disengaged state.

18. The axle assembly as set forth in claim 14 wherein said gear train comprises a first gear coupled to said input shaft, a second gear coupled to said first gear, and an output gear coupled to said output shaft and said second gear.

19. The axle assembly as set forth in claim 14 wherein said drive shaft includes a fitting having a plurality of first external splines.

20. The axle assembly as set forth in claim 19 wherein said output shaft includes a plurality of second external splines.

21. The axle assembly as set forth in claim 20 wherein said clutch includes a collar carried by said shifting fork along said clutch axis between said engaged state and said disengaged state.

22. The axle assembly as set forth in claim 21 wherein said collar comprises a plurality of internal splines engaging said second external splines and being spaced from said first external splines of said fitting when in said disengaged state such that said electric motor and said fitting are not coupled to one another to allow the wheels of the vehicle to rotate independently of said electric motor.

23. The axle assembly as set forth in claim 22 wherein said internal splines have a first portion that engages said second external splines of said output shaft and a second portion that engages with said first external splines of said fitting such that, in said engaged state, said clutch couples said output shaft and said fitting to one another such that said electric motor provides power to said drive shaft.

24. The axle assembly as set forth in claim 14 wherein said gearbox is cantilevered relative to the aligned said first axle housing and said second axle housing to define a gearbox axis transverse to said axle axis.

25. The axle assembly as set forth in claim 14 wherein said motor axis is parallel to said axle axis.

* * * * *